US006332112B1

(12) United States Patent
Shukunami et al.

(10) Patent No.: US 6,332,112 B1
(45) Date of Patent: Dec. 18, 2001

(54) METHOD AND APPARATUS FOR INSPECTING STEAM TRAPS, AND MANAGEMENT SYSTEM FOR MANAGING STEAM TRAPS

(75) Inventors: Hiroshi Shukunami, Itami; Toshio Fujioka, Osaka, both of (JP)

(73) Assignee: Miyawaki Inc., Osaka (JP)

( * ) Notice: Subject to any disclaimer, the term of this patent is extended or adjusted under 35 U.S.C. 154(b) by 0 days.

(21) Appl. No.: 09/353,147

(22) Filed: Jul. 14, 1999

(30) Foreign Application Priority Data

Jul. 17, 1998 (JP) .................................................. 10-203665

(51) Int. Cl.[7] ............................. G01N 11/00; G01M 3/00
(52) U.S. Cl. ................................ 702/56; 73/662; 137/194
(58) Field of Search ............................. 702/56, 108, 179; 73/40.5 A, 46, 592, 662, 665; 137/182–183, 192–194

(56) References Cited

U.S. PATENT DOCUMENTS

| | | | |
|---|---|---|---|
| 4,037,784 | * | 7/1977 | Sabarly ................................. 137/182 |
| 4,623,091 | * | 11/1986 | Stein ..................................... 137/192 |
| 4,727,750 | * | 3/1988 | Yonemura ............................... 73/46 |
| 4,898,022 | * | 2/1990 | Yumoto et al. ........................... 73/46 |
| 5,287,878 | * | 2/1994 | Oike ..................................... 137/192 |

FOREIGN PATENT DOCUMENTS

| | | |
|---|---|---|
| 43 03 798 A1 | 8/1994 | (DE) . |
| 0 402 463 A1 | 12/1990 | (EP) . |
| 0 892 326 A2 | 1/1999 | (EP) . |
| 10-252987 | 9/1998 | (JP) . |

* cited by examiner

*Primary Examiner*—Hal Wachsman
*Assistant Examiner*—Bryan Dui
(74) *Attorney, Agent, or Firm*—Armstrong, Westerman, Hattori, McLeland & Naughton, LLP (57) ABSTRACT

An inspecting apparatus includes a measuring device and a processing unit. The measuring device is provided with a vibration detector for detecting the vibration of a steam trap when a valve thereof is closed. The processing unit is provided with a performance deterioration value calculator for converting the detected vibration level of the steam trap into a sealing performance deterioration value representing a deterioration level of the sealing performance of the valve of the steam trap under a reference steam pressure value using a working steam pressure value, a display for displaying a rank of the sealing performance obtained based on the sealing performance deterioration value, and a trap list storage for storing the sealing performance deterioration value and the rank of the sealing performance as well as ID information of the steam trap. The steam trap can be more precisely inspected.

15 Claims, 9 Drawing Sheets

| DETERIORATION VALUE | 0~10 | 11~30 | | | 31~50 | | | 51~70 | | | 71 OR MORE |
|---|---|---|---|---|---|---|---|---|---|---|---|
| PERFORMANCE (CATEGORY) | NORMAL | LOW | | | MEDIUM | | | HIGH | | | FATAL |
| PERFORMANCE (LEVEL) | – | 1 | 2 | 3 | 4 | 5 | 6 | 7 | 8 | 9 | 10 |

MANAGEMENT LOG

| AREA | TRAP No. | PRODUCT NAME | TYPE | PRODUCER | LINE | PRESSURE (kg/cm²) | DIAMETER | ESTIMATE | RANK | SURFACE TEMP. (°C) | SET TEMP. (°C) | DATE | REMARKS |
|---|---|---|---|---|---|---|---|---|---|---|---|---|---|
| 1 | 1 | ES8 | BACKET | MIYA | MAIN | 10 | 20 | NOR | | 180 | | | |
| | | | | | | | | | | | | | |
| | | | | | | | | | | | | | |
| | | | | | | | | | | | | | |
| | | | | | | | | | | | | | |
| | | | | | | | | | | | | | |

FIG.9

DEFECT LIST

| AREA | TRAP No. | PRODUCT NAME | TYPE | PRODUCER | LINE | PRESSURE (kg/cm²) | DIAMETER | ESTIMATE | RANK | LEVEL | LEAKAGE AMOUNT (kg/h) | SURFACE TEMP. (°C) | SET TEMP. (°C) | DATE | REMARKS |
|---|---|---|---|---|---|---|---|---|---|---|---|---|---|---|---|
| 1 | 2 | TB5 | TA | MIYA | MAIN | 4 | 20 | LEAK | MID | 5 | 6 | 130 | 120 | | |

METHOD AND APPARATUS FOR INSPECTING STEAM TRAPS, AND MANAGEMENT SYSTEM FOR MANAGING STEAM TRAPS

This application is based on patent application No. 10-203665 filed in Japan, the contents of which is hereby incorporated by reference.

BACKGROUND OF THE INVENTION

This invention relates to a method and apparatus for inspecting steam traps provided in steam lines and/or condensate draining lines of an equipment operated using steam in order to drain condensate, and an management system for managing steam traps.

In steam lines and/or condensate draining lines of an equipment operated using steam in order to drain condensate, condensate may be produced by the heat exchange and/or heat release. If this condensate resides in the lines, it causes a reduction in operation efficiency. Accordingly, steam traps are generally provided in specified positions of the lines to drain the condensate.

The sealing performance of a steam trap may be deteriorated due to the deterioration of its valve portion with time, an operation defect and other causes. In such a case, steam in the steam lines leaks outside via the steam trap, leading to a wasteful steam loss. For example, in a large-size plant where several thousands to several ten thousands of steam traps are used, an amount of steam leaked through the steam traps is excessive, and an amount of a loss caused by the steam leakage cannot be ignored. Thus, the regular inspection of the steam traps is required. Conventionally, skilled workers have placed a diagnostic bar or a vibrometer against the traps, judged the steam leakage by experience based on the vibration of the valve portions caused by the steam leakage or the like, and performed a maintenance of the steam traps. However, the maintenance and inspection of the steam traps based on the experience of the skilled workers cannot secure a satisfactory efficiency and undesirably causes differences in the inspection result among skilled workers. Further, in large-size plants, not only the inspection of the steam traps, but also the totaling and analysis of the results and management of the steam traps require a lot of time and labor.

In view of these problems, there have been proposed some solutions. For example, U.S. Pat. No. 4,727,750 discloses a device for measuring steam leakage. Specifically, the device includes a vibration sensor for sensing a vibration of each steam trap, a temperature sensor for sensing a temperature of each steam trap, and a calculator for calculating steam leakage based on sensed vibration and temperature, thereby enabling automatic measurement of steam leakage in each steam trap.

Also, U.S. Pat. No. 4,788,849 discloses a system including a detector for measuring steam leakage in each steam trap, and a host computer for executing record and display of a summation of leakage in a plurality of steam traps, and totalization and analysis of leakage in terms of monetary cost or rejection rate.

However, such device and system as disclosed the above-mentioned United States patents do not execute any judgment as to whether or not the steam trap is of satisfactory quality. Such judgment is required to be made by maintenance personnel. Accordingly, there has been the problem in the aspect of precise inspection of steam traps. Specifically, the amount of leaked steam differs depending upon steam pressure used even if the steam traps are of the same type or have the same level of deterioration. Even if the amount of leaked steam is the same value, there are stream traps which should be judged to be normal and there are those which should be judged to be abnormal depending on the type thereof. Accordingly, the quality of a steam trap cannot be precisely judged if it is detected based on the steam leakage.

Further, it is preferable from the viewpoint of steam trap management to judge the quality of a steam trap during measurement by a portable detector. However, there have been proposed no system or device which makes it possible to judge the quality of a steam trap during measurement of the steam trap.

SUMMARY OF THE INVENTION

It is an object of the present invention to provide a steam trap inspecting method and apparatus, and a steam trap management system which have overcome the problems residing in the prior art.

According to an aspect of the present invention, a steam trap inspecting method comprises the steps of: detecting a vibration level of a steam trap when its valve is closed; converting the detected vibration level into a sealing performance deterioration value representing a deterioration level of a valve sealing performance of the steam trap under a reference steam pressure using a working steam pressure value; and estimating the sealing performance of the steam trap based on the sealing performance deterioration value.

According to another aspect of the present invention, a steam trap inspecting apparatus comprises: a vibration level detector which detects the vibration level of the steam trap when its valve is closed; a calculator which converts the detected vibration level into a sealing performance deterioration value representing a deterioration level of a valve sealing performance of the steam trap under a reference steam pressure using a working steam pressure value; and a notifying device which notifies at least either one of the calculated sealing performance deterioration value and an estimation of the sealing performance based on the sealing performance deterioration value.

According to still another aspect of the present invention, a steam trap management system comprises: a portable steam trap inspecting apparatus including: a vibration level detector which detects the vibration level of the steam trap when its valve is closed; a calculator which converts the detected vibration level into a sealing performance deterioration value representing a deterioration level of a valve sealing performance of the steam trap under a reference steam pressure using a working steam pressure value; and a notifying device which notifies at least either one of the calculated sealing performance deterioration value and an estimation of the sealing performance based on the sealing performance deterioration value, whereby obtaining inspection results including sealing performance deterioration values of a specified number of steam traps; a management unit for totaling and analyzing a variety of pieces of information of the steam traps including the sealing performance deterioration values; and a transfer unit for transferring the inspection results of the inspecting apparatus to the management unit.

These and other objects, features and advantages of the present invention will become more apparent upon a reading of the following detailed description and accompanying drawings.

DETAILED DESCRIPTION OF THE PREFERRED EMBODIMENTS OF THE INVENTION

Embodiments of the invention are described with reference to the accompanying drawings.

Figure 1:
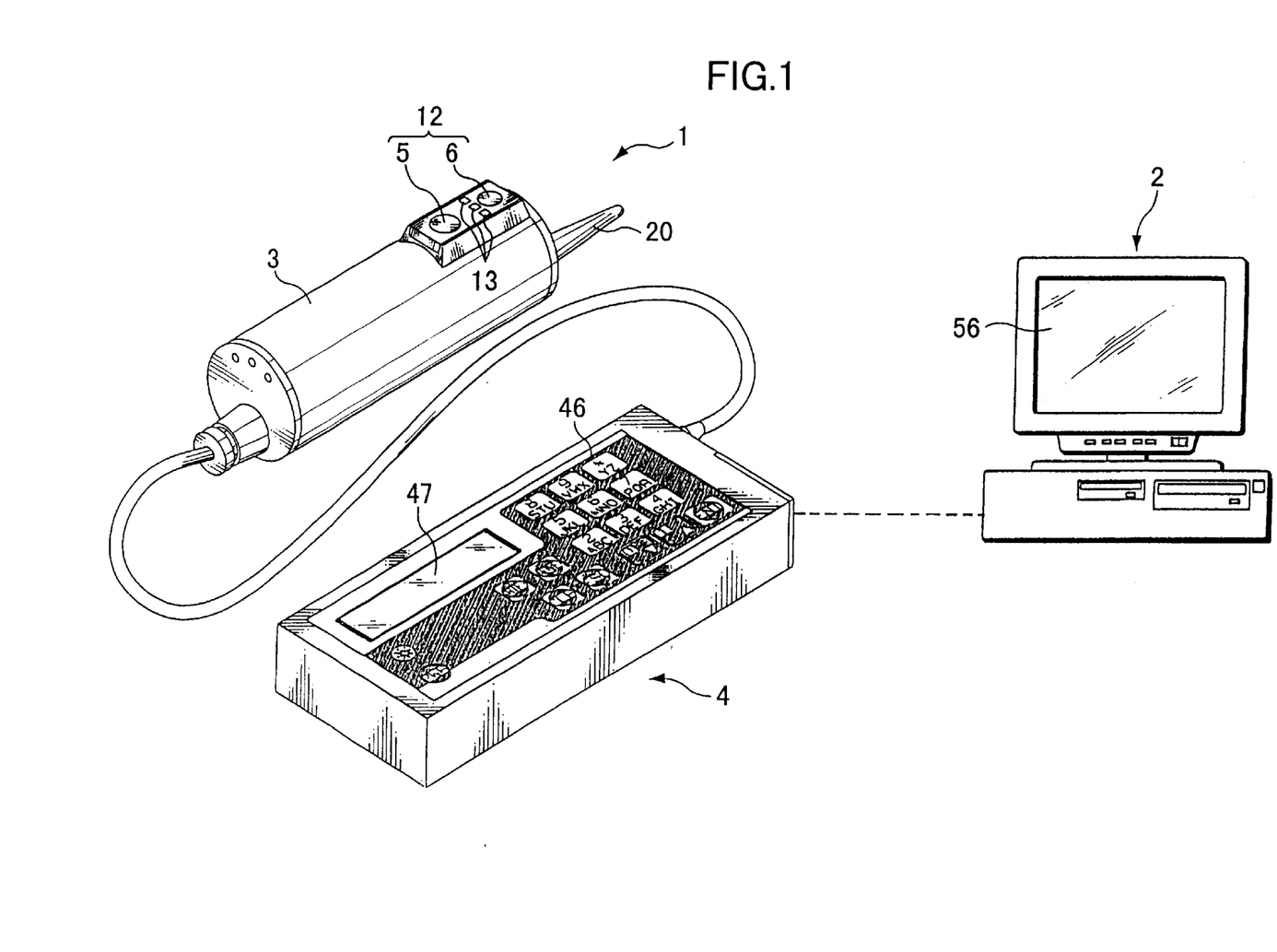
FIG. 1 is a schematic perspective view of a steam trap inspecting system embodying the invention.

FIG. 1 schematically shows a steam trap inspecting system according to the invention. As shown in FIG. 1, this steam trap inspecting system (hereinafter, merely "inspecting system") is provided with a detecting unit 1 and a host computer 2 (management unit) which is a general-purpose computer for totaling and analyzing the detection results. An operator carries the detecting unit 1 around to inspect steam traps provided in positions of piping of a plant. After the completion of the inspection, the detecting unit 1 and the host computer 2 are connected via a wire or radio transmission device, so that data can be transmitted at least from the detecting unit 1 to the management unit 2, preferably in both ways.

The detecting unit 1 is, as shown in FIG. 1, comprised of a measuring device 3 and a processing unit 4 connected with the measuring device 3 via a cable. An inspection is performed while the measuring device 3 is held in contact with the outer surface of a steam trap, and the obtained data are processed in the processing unit 4.

Figure 2:
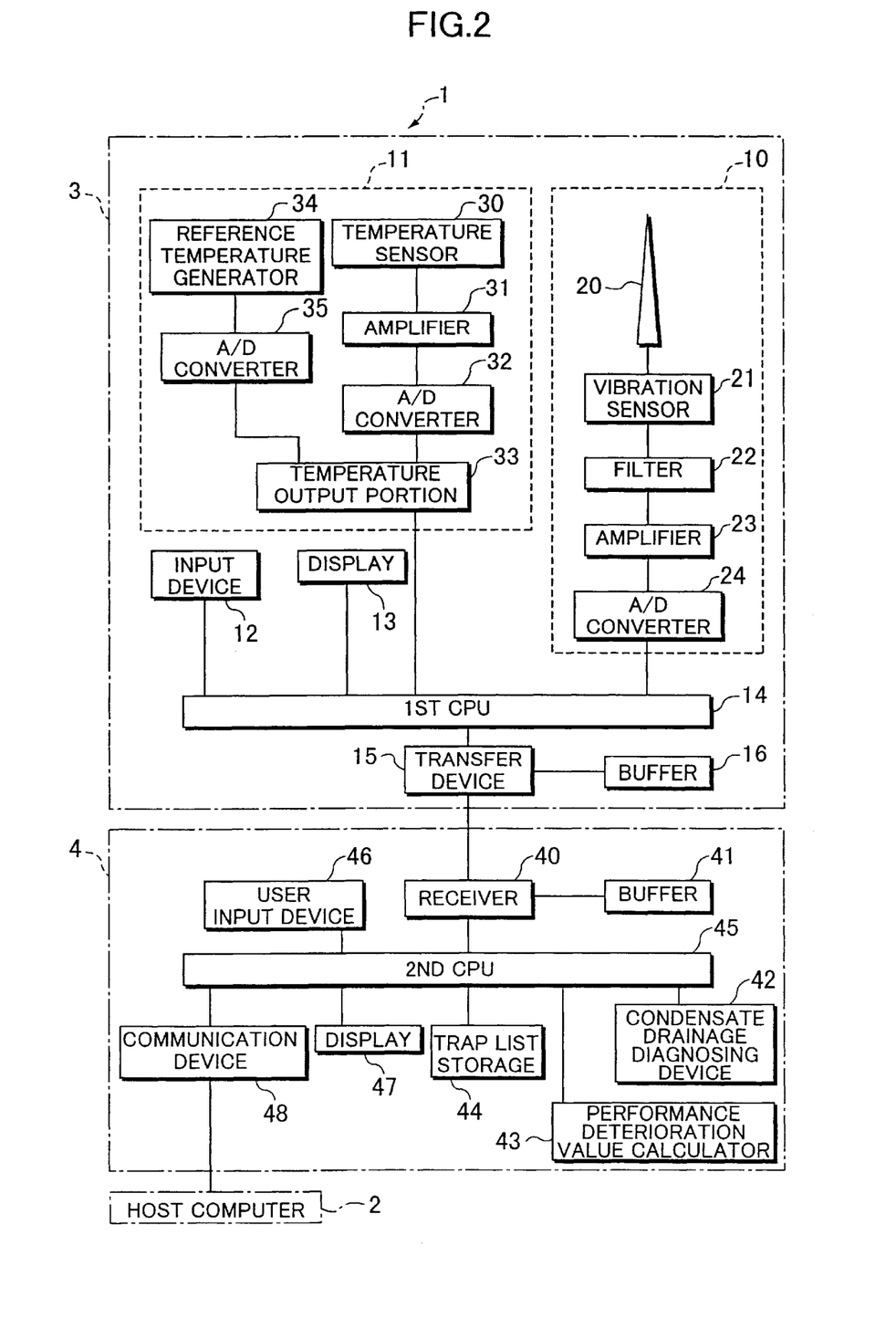
FIG. 2 is a block diagram showing a functional construction of the inspecting system.

FIG. 2 functionally shows the construction of the inspecting system. As shown in FIG. 2, the measuring device 3 includes a vibration detector (vibration level detector) 10 for detecting a vibration of the steam trap, a temperature detector 11 (temperature detector) 11 for detecting a temperature of the steam trap, an input device 12 having a measurement start switch 5 and a sensitivity change-over switch 6 (shown in FIG. 1) for the temperature detection, a display 13 for displaying an operative state of the sensitivity change-over switch 6, and a first central processing unit (CPU) 14 for centrally controlling the measuring device 3. The vibration detector 10 and the like are connected with the first CPU 14. The measuring device 3 also includes a transfer device 15 for transferring the detection data of the vibration detector 10 and the temperature detector 11 to the processing unit 4, and a buffer 16 for storing data before transferring them. The transfer device 15 is connected with the first CPU 14 and the buffer 16 is connected with the transfer device 15.

The vibration detector 10 is provided with a vibration probe 20, a vibration sensor 21, a filter 22, an amplifier 23 and an analog-to-digital (A/D) converter 24. The vibration probe 20 acts as a detection element for detecting the vibration of the steam trap. The vibration sensor 21 is comprised of a piezoelectric ceramic device for producing electric charges corresponding to the intensity of the vibration transmitted from the vibration probe 20. The filter 22 specifies a frequency band of the inputted vibration. The amplifier 23 amplifies an output voltage generated by electric charges produced by the vibration sensor 21 at a specified gain. The A/D converter 24 converts an analog output of the amplifier 23 into a digital value and outputs it to the first CPU 14.

The A/D converter 24 has such a predefined conversion relationship of output and input values that an inputted detection voltage has a value 0 if a valve of a specific normal steam trap and a valve seat are ideally closed when the steam trap is used under a specified reference steam pressure while having a value 100 if the valve and the valve seat are completely open to flow only steam. For example, if the vibration level of the steam trap used under the specified reference steam pressure is detected, a value in the range of 0 to 100 is outputted as a digital value. On the other hand, if the steam trap is used under a pressure exceeding the specified reference steam pressure, a digital value exceeding 100 may be outputted.

The vibration probe 20 projects from the leading end of the cylindrical measuring device 3 as shown in FIG. 1.

The temperature detector 11 is comprised of a temperature sensor 30, an amplifier 31, an A/D converter 32, a reference temperature generator 34, and a temperature output portion 33. The temperature sensor 30 reacts with infrared rays radiated from the outer surface of the steam trap to produce electric charges corresponding to the intensity of the infrared rays. The amplifier 31 amplifies an output voltage of the temperature sensor 30 at a specified gain. The A/D converter 32 converts an analog output of the amplifier 31 into a digital value. The reference temperature generator 34 outputs a voltage of a temperature level near the temperature sensor 30. The A/D converter 35 converts an analog output of the reference temperature generator 34 into a digital value. The temperature output portion 33 calculates a temperature value of the steam trap based on the outputs of the respective A/D converters 32, 35 and outputs it to the first CPU 14.

The temperature sensor 30 is arranged near the base end of the vibration probe 20 at the leading end of the measuring device 3. Accordingly, the sensitivity of the temperature sensor 30 is so adjusted as to precisely detect a temperature with the steam trap held in contact with the leading end of the vibration probe 20. The sensitivity of the temperature sensor 30 are changeable in a plurality of stages. In this embodiment, it is changeable in three stages. The operator operates the sensitivity change-over switch 6 to change the sensitivity. The temperature output portion 33 applies a specified sensitivity adjustment calculation to the output value of the A/D converter 32 and outputs the temperature value corresponding to the set sensitivity level to the first CPU 14.

On the other hand, the processing unit 4 is provided with a receiver 40, a condensate drainage diagnosing device 42, a performance deterioration value calculator 43, a trap list storage 44, and a second CPU 45. The receiver 40 receives the respective vibration and temperature data transferred from the measuring device 3 while storing them in a buffer 41. The diagnosing device 42 diagnoses a condensate draining state of the steam trap. The calculator 43 calculates a numerical value (sealing performance deterioration value) representing a deterioration level of a valve closing performance (sealing performance) of the steam trap. The storage 44 stores the diagnosis result of the condensate draining state, the calculated sealing performance deterioration value, etc. The second CPU 45 centrally controls the processing unit 4. With the second CPU 45 are connected the receiver 40 and other devices of the processing unit 4. There are also provided a user input device 46, a display 47 (notifying device) and a communication device 48, which are all connected with the second CPU 45. The user input device 46 is comprised of a plurality of keys used to input pieces of information necessary for the inspection and management of the steam traps. The display 47 is made of, e.g., a liquid crystal display for displaying the diagnosis result of the condensate draining state, etc. The communication device 48 transmits and receives the data to and from the host computer 2.

To the processing unit 4 are inputted, for example, names of areas (names of arranged places) where the steam traps to be inspected are arranged, names of types of the steam traps classified by the operating principle, product names, working steam pressure, etc. These pieces of information are formulated into a list of data for the respective steam traps (hereinafter, "trap list") in the second CPU 45, and the formulated trap list is stored in the trap list storage 44. It should be noted that the trap list may be prepared in advance by the host computer 2. In such a case, a data on the trap list is transferred to the processing unit 4 via the communication device 48 and stored in the trap list storage 44.

Based on the respective vibration and temperature data transferred from the measuring device 3, the condensate drainage diagnosing device 42 diagnoses the condensate draining state and the performance deterioration value calculator 43 calculates the sealing performance deterioration value as described later. Further, the sealing performance is ranked based on the sealing performance deterioration value. These results are stored in the trap list storage 44 after being recorded in the trap list.

Next, a steam trap inspecting method applied to the inspecting apparatus 1 is described with reference to a flowchart of FIG. 3.

In the inspection of the steam trap, the condensate draining state of the steam trap is first diagnosed using the temperature data. A diagnosing method slightly differs depending on the type of the valve operating principle of the steam trap. Here, a diagnosing method for thermostatic steam traps is exemplarily described.

First, in Step S1, it is discriminated whether a detected temperature T is equal to or higher than a preset proper temperature Tr1. The proper temperature Tr1 is a temperature of the steam trap when no condensate resides and is calculated based on a working steam pressure value.

If the discrimination result in Step S1 is affirmative, this flow proceeds to Step S4 upon judgment that condensate is at least normally drained.

If the discrimination result in Step S1 is negative, this flow proceeds to Step S2, in which it is discriminated whether the detected temperature T is equal to or higher than a permissible temperature value Tr2 (Tr1>Tr2). The permissible temperature value Tr2 is a temperature of the steam trap, for example, when condensate temporarily resides there and is calculated based on the working steam pressure value. If the discrimination result in Step S2 is affirmative, it is judged that the steam trap is normally operating, i.e., the condensate draining state and the sealing performance are both satisfactory. In other words, the detected temperature T being below the proper temperature Tr1 and equal to or higher than the permissible temperature Tr2 represents a case where the condensate normally resides as described above and means that the steam trap is free from leakage. Thus, the steam trap is estimated to be "normal" without checking the sealing performance (without performing operations of Step 4 and subsequent Steps)

If the discrimination result in Step S2 is negative, this flow proceeds to Step S3, in which it is discriminated whether the detected temperature T is equal to or higher than a critical temperature value Tr3 (Tr2>Tr3). The critical temperature value Tr3 is a boundary temperature between the operative state of the steam trap and the inoperative state thereof. If the discrimination result in Step S3 is positive, it is estimated that a large quality of condensate resides in the steam trap, i.e., "defective drainage". If the discrimination result in Step S3 is negative, the steam trap is estimated to be "plugged or out of service". In other words, the detected temperature T is often below the permissible temperature value Tr3 also in the case that the valve of the steam trap is in its closed state and, accordingly, the inoperative state of the steam trap and the closed state thereof cannot be distinguished. Thus, the steam trap is estimated to be "plugged or out of service" in this case.

On the other hand, in Step S4, the vibration data is converted into a sealing performance deterioration value in the range of 0 to 100, which are normalized values free from the restriction of the working steam pressure.

The value of the detected vibration data differs according to the working steam pressure, i.e., it becomes larger as the working steam pressure becomes larger even if the sealing performance of the steam trap is equally deteriorated. Further, the following is empirically known. If the working steam pressure becomes excessively smaller, the intensity of the vibration generated becomes feeble to the extent that it cannot be detected any longer. Conversely, if the working steam pressure becomes excessively larger, the intensity of the vibration becomes substantially constant regardless of an increase in pressure. Thus, the sealing performance deterioration value is obtained by applying a pressure correction to the vibration data detected by the measuring device 3 and is used as a standard in estimating the sealing performance.

Specifically, the sealing performance deterioration value Vc is calculated by Equation (1)

$$Vc = Vi \cdot \eta \cdot \{1 + a(Ps-P)/P\}$$

Where
  Vc: sealing performance deterioration value
  Vi: detected vibration level
  $\eta$: (type) coefficient corresponding to the type of the steam trap
  a: correction coefficient
  Ps: reference steam pressure
  P: working steam pressure.

The smaller the sealing performance deterioration value Vc is, the less the sealing performance is deteriorated, i.e., the more satisfactory the sealing performance is.

The detected vibration level vi is an average value of the detected vibration data (output values of the A/D converter 24). In other words, in this embodiment, the vibration of the steam trap is detected at intervals of 0.5 seconds for 10 seconds as described later, and the detected vibration level Vi means an average value of these obtained data The detected vibration level Vi is calculated by removing data obtained immediately after the w start of the detection since they generally have low reliability, extracting a specified number of data having small values from the vibration data and calculating an average value of the extracted data. The vibration data necessary to check the sealing a performance are those obtained when the valve of the steam trap is closed. However, it is difficult to judge outside the steam trap whether the valve of the steam trap is open or closed.

On the other hand, it is empirically known that the vibration data values obtained when the valve of the steam trap is open are larger than those obtained when the valve of the steam trap is closed. Therefore, the vibration data having small values are assumed as the vibration data obtained when the valve of the steam trap is closed, and an average value thereof is calculated as the detected vibration level Vi.

The type coefficient η represents the type of the steam trap in terms of its construction or the like. Strictly speaking, the detected vibration values differ depending on the construction or the like of the steam trap even if the working steam pressure is same. Thus, a correction based on the type of the steam trap is made in addition to the pressure correction. In the case of a special equipment for measuring the same type of steam traps, a fixed value may be used as the type coefficient η. Alternatively, the necessity of the type coefficient η may be considered if necessary from a precision point of view. Further, the correction coefficient a is used to correct a change in a characteristic curve of the vibration level and the working steam pressure, and a value 1 is normally used or a specific value is empirically set based on a characteristic curve obtained by an experiment conducted in advance.

After the sealing performance deterioration value Vc is calculated in Step S4, the sealing performance is subsequently ranked based on the sealing performance deterioration value Vc.

Specifically, based on preset comparison values Vr1 (=10), Vr2 (=30), Vr3 n(=50), Vr4(=70) corresponding to the sealing performance deterioration value Vc, it is discriminated in Step S5 whether the sealing performance deterioration value Vc is larger than the comparison value Vr1. If the discrimination result is negative, the sealing performance of the steam trap is estimated to be "normal". If the discrimination result is affirmative, this flow proceeds to Step S6 in which it is discriminated whether the sealing performance deterioration value Vc is larger than the comparison value Vr2. If the discrimination result is negative, the deterioration level of the sealing performance of the steam trap is estimated to be "low", i.e., the sealing performance is estimated to be deteriorated a little. If the discrimination result is affirmative, this flow proceeds to Step S7 in which it is discriminated whether the sealing performance deterioration value Vc is larger than the comparison value Vr3. If the discrimination result is negative, the deterioration level of the sealing performance of the steam trap is estimated to be "medium", i.e., the sealing performance is estimated to be mediumly deteriorated. If the discrimination result is affirmative, this flow proceeds to Step S8 in which it is discriminated whether the sealing performance deterioration value Vc is larger than the comparison value Vr4. If the discrimination result is negative, the deterioration level of the sealing performance of the steam trap is estimated to be "high", i.e., the sealing performance is estimated to be highly deteriorated. If the discrimination result is affirmative, the deterioration level of the sealing performance of the steam trap is "fatal", i.e., the valve of the steam trap is too deteriorated to operate or in a state approximate to this.

Figure 4:
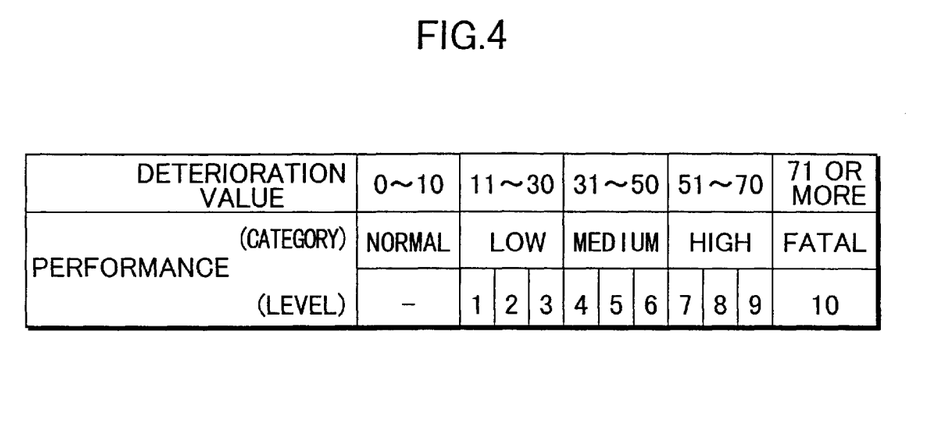
FIG. 4 is a table showing ranks of a sealing performance based on sealing performance deterioration values, and deterioration levels.

In other words, the sealing performances of the steam traps are classified into 5 categories based on the sealing performance deterioration value Vc as shown in FIG. 4. Further, each category excluding those "normal" and "fatal" is divided into three stages as shown in FIG. 4, so as to define deterioration levels having numerical values of 0 to 10. The sealing performance of the steam trap is estimated by the deterioration level.

Next, a concrete procedure for inspecting the steam trap by the inspecting apparatus 1 and the operation of the inspecting apparatus 1 are described with reference to a flowchart shown in FIGS. 5 and 6.

Prior to the inspection, the operator stores the trap list in the processing unit 4. The operator conducts this inspection while carrying around the inspecting apparatus 1 and a piping plan or arrangement plan in which the positions of the steam traps are marked.

First, the operator operates the user input device 46 of the processing unit 4 to cause the area name and the ID number of the steam trap to be inspected to be displayed on the display 47, places the vibration probe 20 against the outer surface of the steam trap while gripping the measuring device 3, and starts measuring by operating the measurement start switch 5. At this time, the sensitivity of the temperature sensor 30 is set at a desired sensitivity in advance by operating the sensitivity change-over switch 6.

Figure 5:
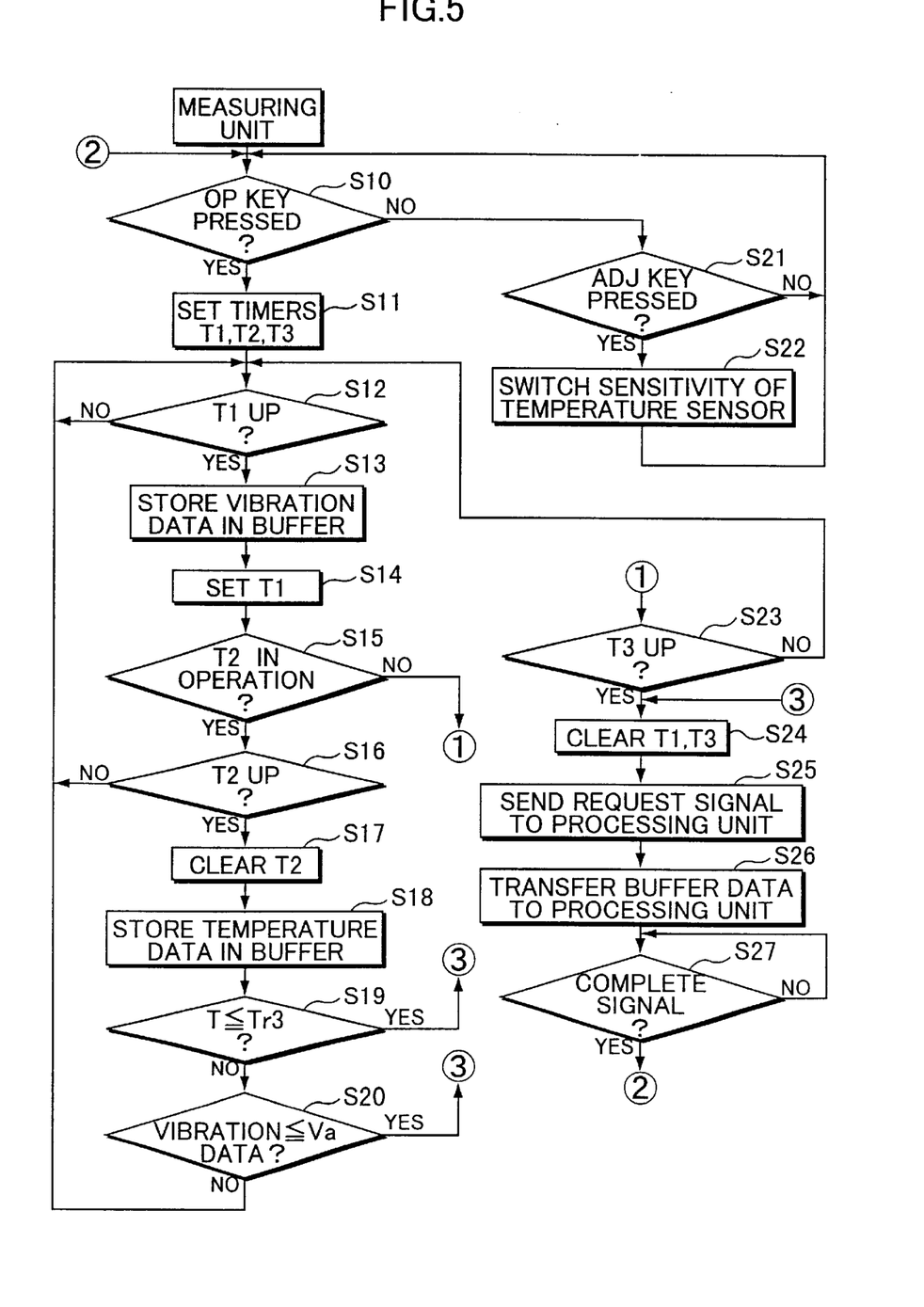
FIGS. 5 and 6 is a flowchart showing an operation of a measuring device during the inspection.

In the measuring device 3, as shown in FIG. 5, it is first discriminated whether the measurement start switch 5 (OP key) has been pressed (Step S10). If the discrimination result is negative, it is discriminated whether the sensitivity change-over switch 6 (ADJ key) has been operated (Step S21). If the discrimination result in Step S21 is positive, the sensitivity of the temperature sensor 30 is switched to a sensitivity according to the operation of the temperature sensor 30 (Step S22).

When the measurement start switch 5 (OP key) is pressed in Step S10, timers T1, T2, T3 in the first CPU 14 are set, respectively (Step S11). The timers T1, T2, T3 measure a detection interval of the vibration data, a temperature detection time, and a reference detection time, respectively. In this embodiment, T1=0.5 sec., T2=4 sec., and T3=10 sec.

In Step S12, it is discriminated whether the timer T1 has already counted up the detection interval. If the discrimination result is affirmative, the vibration data is stored in the buffer 16 (Step S13) and the timer T1 is set again (Step S14).

It is then discriminated whether the timer T2 is in operation (Step S15). If the discrimination result is affirmative, it is discriminated whether the timer T2 has already counted up the temperature detection time in Step S16.

If the discrimination result in Step S16 is affirmative, the timer T2 is cleared (Step S17) and the temperature data is stored in the buffer 16 (Step S18). Then, it is discriminated whether the detected temperature is equal to or below the critical temperature value Tr3 (Step S19) and whether all the vibration data stored in the buffer 16 are equal to or below a satisfactory value Va (Step S20). This flow proceeds to Step S24 if the discrimination results in Steps S19 and S20 are affirmative, while returning to Step S12 if they are both negative. Here, the satisfactory value Va is a vibration level obtained when a valve of a steam trap having a proper sealing performance is closed. If the discrimination result in Step S16 is negative, this flow returns to Step S12.

On the other hand, if the discrimination result in Step S15 is negative, it is discriminated whether the timer T3 has already counted up the reference detection time (Step S23). This flow returns to Step S12 if the discrimination result is negative. If the discrimination result is affirmative, the timers T1, T3 are cleared (S24) and, after a data transfer request signal is sent to the processing unit 4 via the transfer device 15 (Step S25), the data stored in the buffer 16 are transferred to the processing unit 4 (Step S26). When a data reception completion signal is sent to the measuring device 3 (Step S27), this flow returns to Step S10, entering a standby state.

Specifically, the measuring device 3 basically obtained 20 data for 10 sec. by detecting the vibration of the steam trap at intervals of 0.5 sec., and detects the temperature of the steam trap 4 sec. after the start of the measurement. If the conditions of Steps S19 and S20 are satisfied at this stage, the detection of the vibration is stopped thereafter and the data already stored in the buffer 16 are transferred to the processing unit 4. In other words, if the steam trap is judged to be "plugged or out of service" in Step S19, the inspection time is shortened by immediately ending the inspection if the vibration data based on which the draining state can be diagnosed to be normal is obtained in Step S12.

Figure 6:
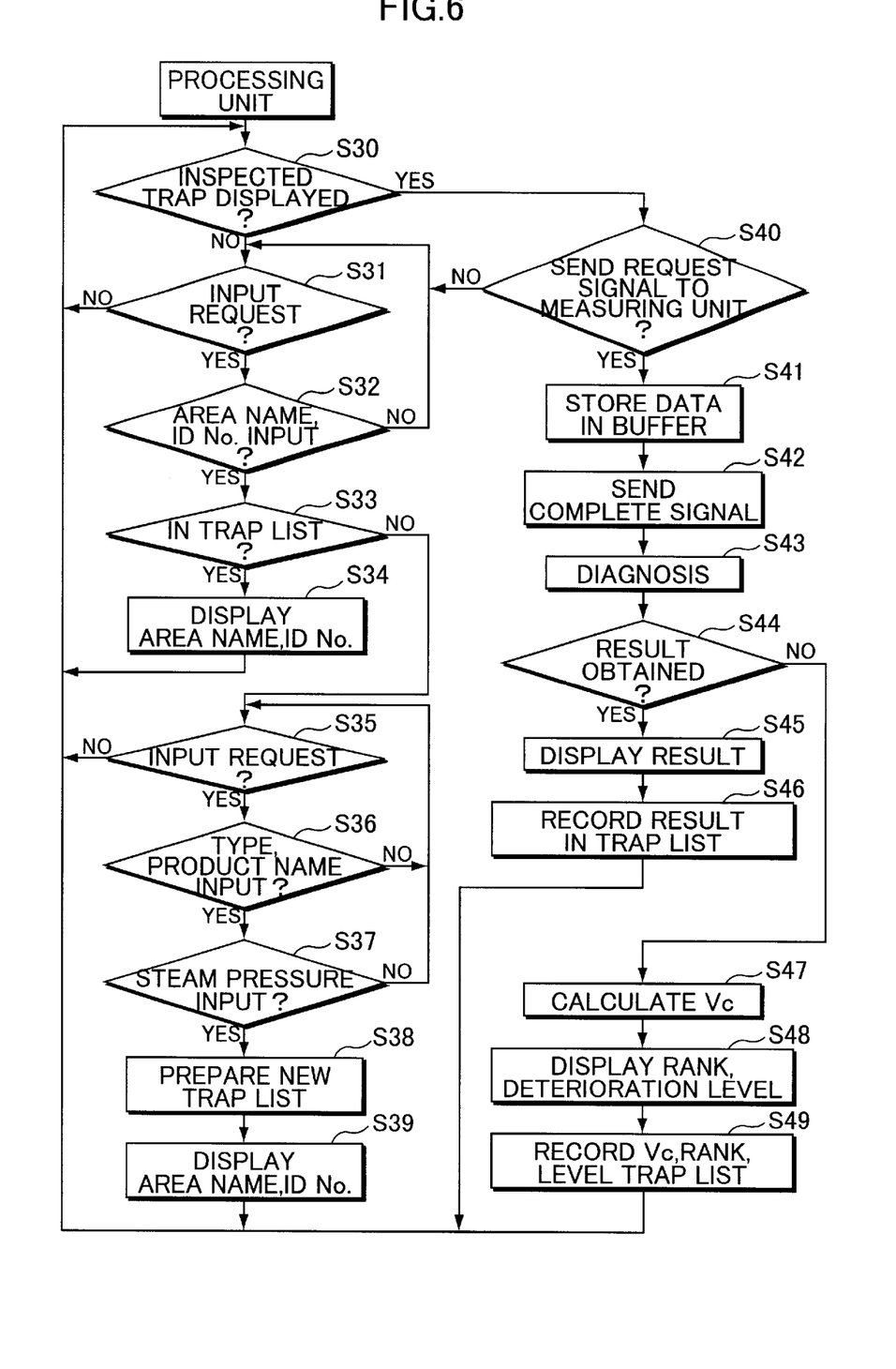

In response to the above operation of the measuring device 3, it is discriminated in the processing unit 4 as shown in FIG. 6 whether the area name and ID No. of the steam trap to be inspected are being displayed on the display 47 (Step S30). If the discrimination result in Step S30 is negative, the processing unit 4 enters an input requesting state, i.e., an input standby state where it waits for the area name and other inputs by means of the user input device 46 (Step S31), and it is discriminated whether the area name and ID No. of the steam trap to be inspected have been inputted (Step S32). This flow returns to Step S30 if the discrimination result in Step S31 is negative.

If the discrimination result in Step S32 is affirmative, it is discriminated whether the steam trap to be inspected exists in the trap list stored in the processing unit 4 (Step S33). If there is such a steam trap in the trap list, this flow returns to Step S30 after the area name and ID No. of this steam trap are displayed on the display 47 (Step S34). This flow returns to Step S31 if the discrimination result in Step S32 is negative.

If the steam trap to be inspected is judged not to exist in the trap list in Step S33, it is discriminated whether there has been an input request for new registration (Step S35), and this flow returns to Step S30 if the discrimination result is negative. On the other hand, if the discrimination result in Step S35 is affirmative, it is successively discriminated whether pieces of information including the type name and product name of this steam trap and the working steam pressure have been inputted (Steps S36, S37). Upon judging that these pieces of information have been inputted, a trap list of this steam trap is newly prepared and stored in the trap list storage 44 (Step S38), and the area name and ID No. of this steam trap are displayed on the display 47 (Step S39). Then, this flow returns to Step S30.

On the other hand, if the area name and the ID No. of the steam trap to be inspected are judged to be displayed on the display 47 in Step S30, it is discriminated whether the measuring device 3 has been issued a transfer request for the vibration and temperature data. If the discrimination result is affirmative, the data from the measuring device 3 are received and stored in the buffer 41 (Step S41) and sends the data reception completion signal to the measuring device 3 (Step S42). This flow returns to Step S31 if the discrimination result in Step S40 is negative.

Figure 3:
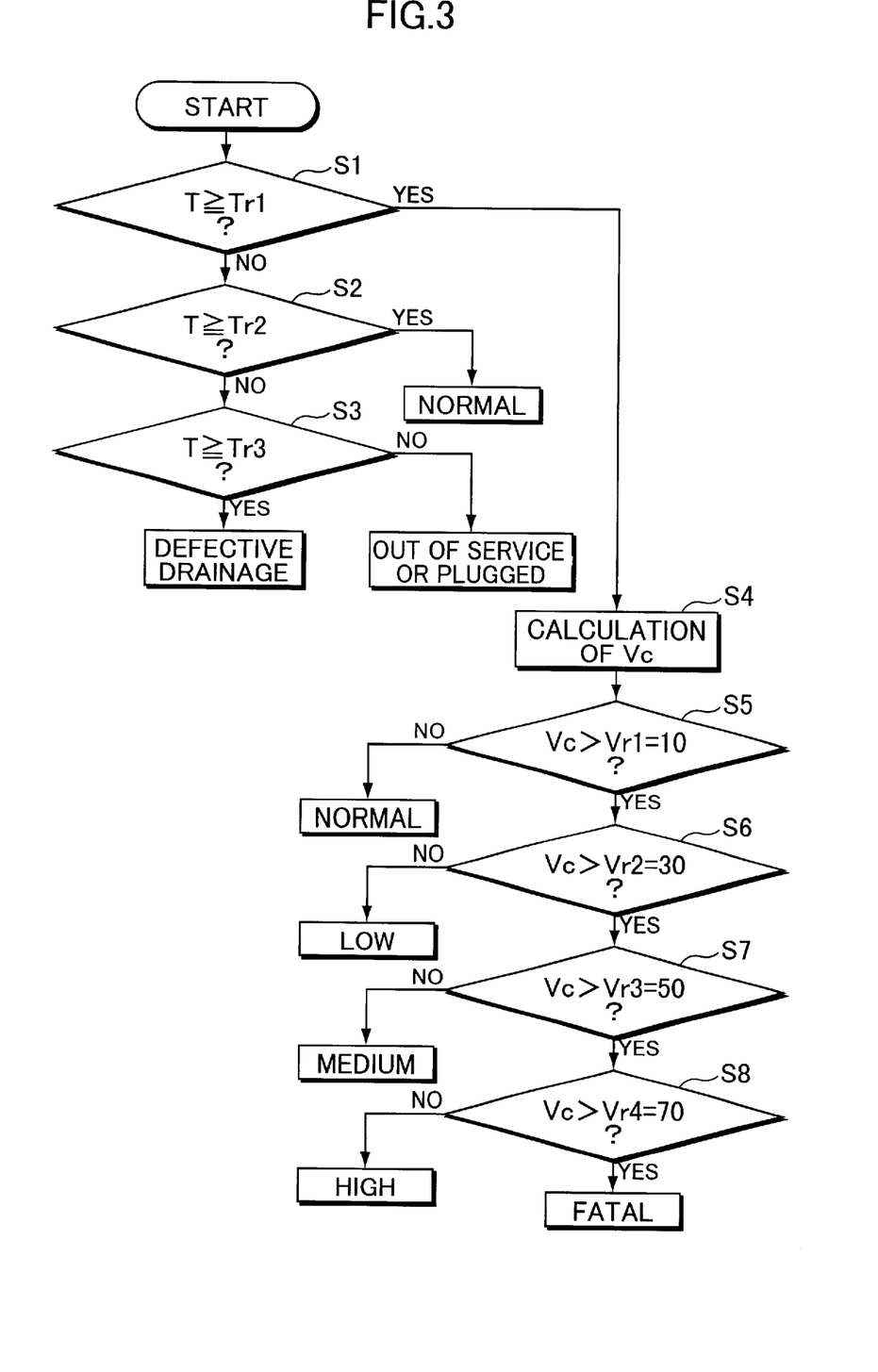
FIG. 3 is a flowchart showing an exemplary inspecting method according to the invention.

The temperature data stored in the buffer 41 is transferred to the condensate drainage diagnosing device 4, which in turn diagnoses the condensate draining state by performing the operations of Steps S1 to S3 of FIG. 3 (Step S43). Subsequently, it is discriminated whether the diagnosis result has been obtained, i.e., the condensate draining state has been diagnosed to be "normal", "defective" or "plugged or out of service" (Step S44). If the diagnosis result has been obtained, it is displayed on the display 47 (Step S45) and recorded in the trap list (Step S46). Then, this flow returns to Step S30.

On the other hand, if no diagnosis result can be obtained in Step S44, the vibration data stored in the buffer 41 is transferred to the performance deterioration value calculator 43 and the sealing performance deterioration value Vc is calculated by performing the operations of Steps S4 to S8 of FIG. 3 (Step S47). The sealing performance of the steam trap is then ranked as one of the five categories, and a numerical deterioration level is calculated, and the rank of the sealing performance and the numerical deterioration level are displayed on the display 47 (Step S48) and recorded in the trap list (Step S49). Then, this flow returns to Step S30.

As described above, in the inspection of the steam trap using the inspecting apparatus 1, the operator causes the ID No. and the like of the steam trap to be inspected to be displayed on the display 47 by operating the user input device 46. By placing the measuring device 3 against the outer surface of the steam trap in this state, the estimation of the condensate draining state of the steam trap, the rank of the sealing performance, etc. are automatically displayed on the display 47. Further, the sealing performance deterioration value Vc and the above estimation and rank, etc. are stored in the trap list storage 44 after being recorded in the trap list.

After the completion of the inspection, the processing unit 4 is connected with the host computer 2 and the data stored in the trap list storage 44 are transferred to the host computer 2, thereby enabling the totaling and analysis of the inspection results.

Figure 7:
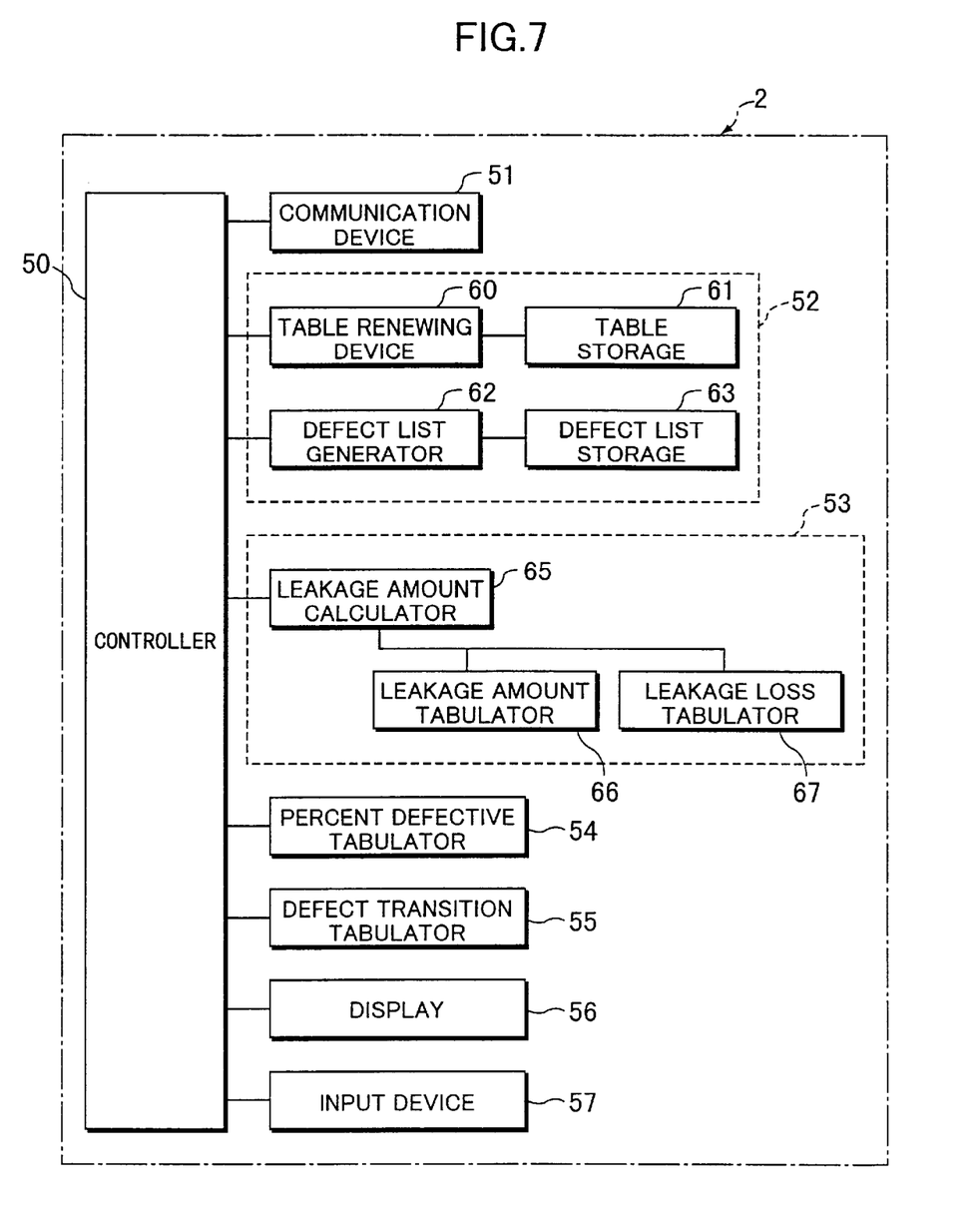
FIG. 7 is a block diagram showing an exemplary functional construction of a host computer.

The host computer 2 has, for example, a construction as shown in FIG. 7. Specifically, the host computer 2 is provided with a communication device 51 for the communication with the processing unit 4, a data base unit 52 used to generate a variety of lists, a leakage amount calculating unit 53 for calculating an amount of steam leaked through the steam trap, a percent defective tabulator 54, a defect transition tabulator 55, a controller 50 for centrally controlling the host computer 2. The communication device 51 and the other devices are respectively connected with the controller 50. The host computer 2 is further provided with a display 56 and an input device 57 comprised of a keyboard or the like. The display 56 and the input device 57 are respectively connected with the controller 50.

Figure 8:
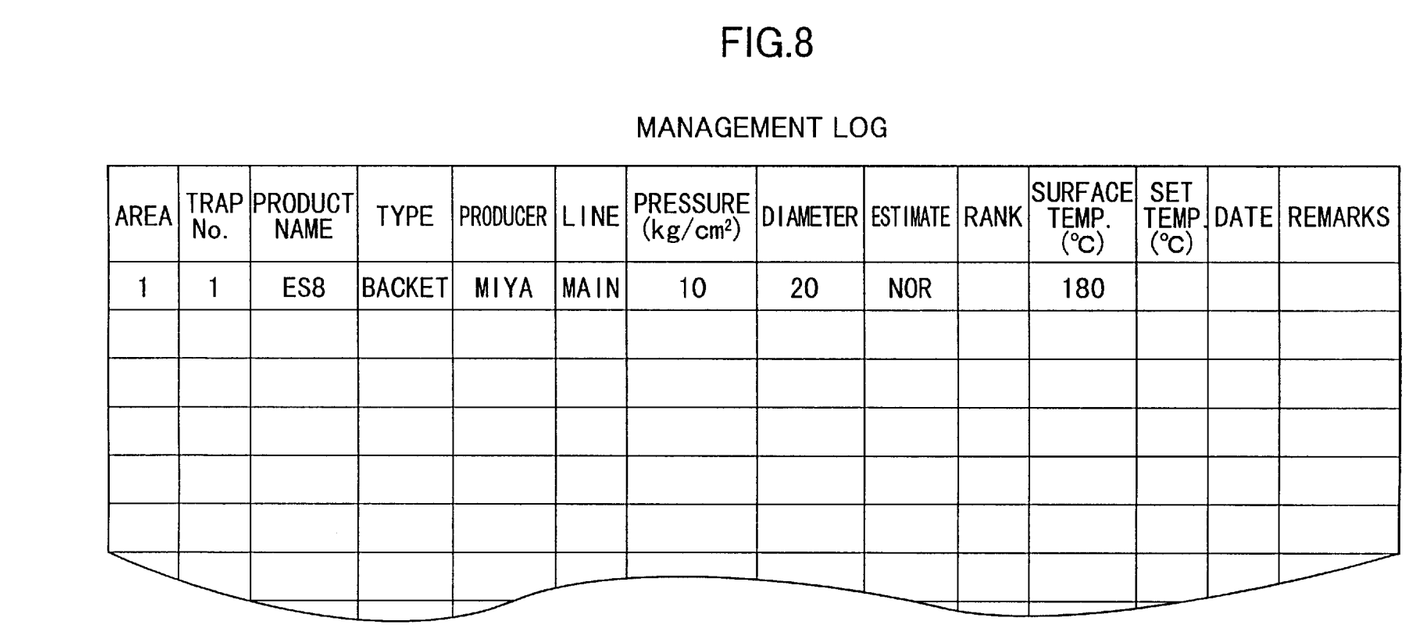
FIG. 8 is a diagram showing an exemplary management log for steam traps.
Figure 9:
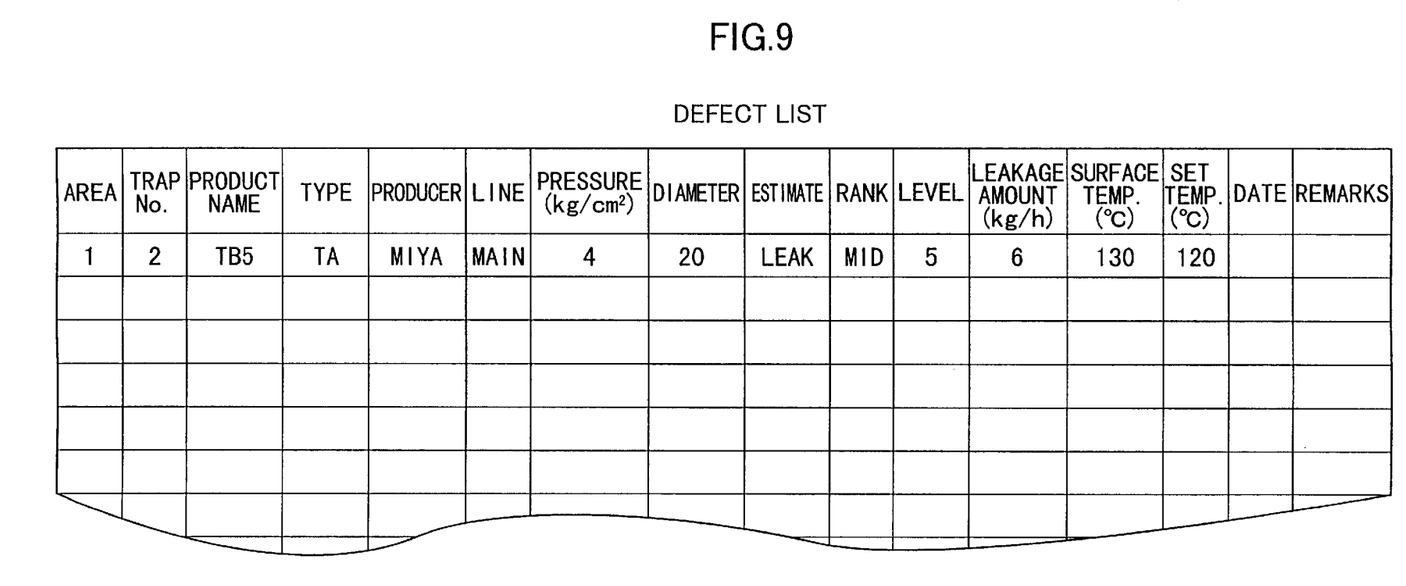
FIG. 9 is a diagram showing an exemplary defect list.

The data base unit 52 includes a table renewing device 60 for generating and renewing a steam management log (hereinafter, "management log") as shown in FIG. 8 and a table storage 61 for storing the management log. The data base unit 52 generates a trap list based on the management log while generating and renewing the management log based on the trap list transferred from the inspecting apparatus 1, and transfers the generated trap list to the inspecting apparatus via the communication device 51. The data base unit 52 also includes a defect list generator 62 to extract data indicating a defective condensate drainage and having a sealing performance deterioration value Vc beyond the normal range from the individual steam trap data recorded in the management log, to generate and renew a defect list as shown in FIG. 9, and to store the defect list in a defect list storage 63.

The percent defective tabulator 54 sorts the steam traps registered in the defect list according to specific categories such as the types and areas of the steam traps using its sorting function, calculates a percent defective for each category using its percent defective calculating function, and generates a defect analysis in the form of a table or a graph.

The defect transition tabulator 55 generates and renews a defect transition list including results of a plurality of inspections conducted in the past for the percent defective obtained as above, a leakage amount and a leakage loss to be described later.

The leakage amount calculating unit 53 includes a leakage amount calculator 65, a leakage amount tabulator 66 and a leakage loss tabulator 67 which are connected with the leakage amount calculator 65. In the leakage amount calculator 65, a leakage amount is calculated for each of the steam traps registered in the defect list and having a sealing performance deterioration value Vc exceeding the normal range. Based on the calculation results, total leakage amount for each area and a total leakage amount for all areas and an amount of a loss caused by the leakage are calculated in the leakage amount tabulator 66 and the leakage loss tabulator 67.

The steam leakage amount of the steam trap is calculated by, for example, the equation using the sealing performance deterioration value Vc.

$$Q=q(d, P, \zeta)\cdot Vc/100$$

where

Q: leakage amount q: a function for calculating an outflow steam amount when the valve of the steal trap is open d: equivalent leakage nozzle diameter (i.e., a diameter of a circular area obtained by converting a minimum section of the passage of steam when the valve of the steam trap is open)

P: working steam pressure $\zeta$: type coefficient

Vc: Sealing Performance deterioration value

The substantial size of steam passage differs depending on the construction of the steam trap even if the equivalent leakage nozzle diameter d is same. Thus, type coefficient $\zeta$ is a coefficient for compensating for this difference and is set for each type of the steam traps.

With the host computer 2 constructed as above, if the data stored in the trap list storage 44 of the inspecting apparatus 1 are transferred to the host computer 2 after the completion of the inspection, the generation and renewal of the management log and the defect list, the calculation and tabulation of the steam leakage amount and the tabulation of the transition of the percent defective and leakage loss can be automatically performed. Further, the defect analysis and the defect transition list can be formulated into a table or a graph to be displayed on the display 56.

As described above, according to the inventive steam trap inspecting apparatus, the inspecting apparatus 1 is carried around during the inspection. If the measurement start switch 5 is operated with the measuring device 3 held in contact with the steam trap, the estimation of the condensate draining state, the sealing performance deterioration value Vc or the rank of the sealing performance deterioration value Vc of the steam trap are automatically calculated and displayed on the display 47 of the processing unit 4. In this way, the state of the steam trap can be estimated by a very simple operation. It should be noted that the measurement start switch 5 may be a mechanical switch which automatically starts the inspection upon detecting the contact of the measuring device 3 with the steam trap.

Further, since one inspection is performed within a very short time of 10 sec. as described above, all steam traps can be quite quickly inspected even if a multitude of steam traps are to be inspected in a large-size plant or the like. Furthermore, with the inspecting apparatus 1, the inspection time can be shortened by immediately ending the inspection if specific conditions were satisfied, i.e., the steam trap was judged to be "plugged or out of service" and necessary vibration data could be obtained. Therefore, in view of the fact that most of steam traps usually normally function in a plant or the like, the above advantage contributes to the shortening of the inspection time.

Further, in the inspection of the steam trap by the inspecting apparatus 1, after the condensate draining state of the steam trap is diagnosed based on the temperature data, the sealing performance of the steam trap is checked based on the vibration data. By performing the inspection from many aspects, the abnormality of the steam trap can be securely detected. Particularly, the sealing performance of the steam trap is checked based on a normalized value (sealing performance deterioration value) obtained by applying a pressure (working steam pressure) correction or type correction to the detected vibration data of the steam trap as described above. Accordingly, even if the working steam pressure and the type of the steam trap differ, the state of the steam trap can be correctly estimated. Therefore, as compared with the conventional system of this type which estimates the state of the steam trap uniformly based on whether or not steam is leaking and how much steam is leaking, the steam trap can be more precisely inspected.

As described above, in the diagnosis of the sealing performance, the levels of the sealing performances of the steam traps are ranked into 5 categories based on the sealing performance deterioration value Vc, and the respective categories excluding "normal" and "fatal" are divided into 3 sub-categories, so that the deterioration level can be obtained as a numerical value in a range of 0 to 10. Therefore, the deteriorated state of the sealing performance can be objectively easily estimated.

In the above inspecting system, the inspection results can be totaled and analyzed by the host computer 2 by connecting the inspecting apparatus 1 with the host computer 2 and transferring the data thereto. Accordingly, the management and preparation of materials necessary for the maintenance and inspection of the steam traps and other operations can be very efficiently performed.

The above inspecting system is only one embodiment of the steam trap inspecting system according to the invention, and its specific construction can be changed within the range not departing from the scope and spirit of the present invention.

For example, in the inspecting apparatus 1, after the condensate draining state of the steam trap is diagnosed based on the temperature data as described above, the sealing performance of the steam trap is estimated based on the vibration data. The sealing performance deterioration value Vc may be immediately calculated based on the detected vibration data to estimate the sealing performance without diagnosing the condensate draining state. However, the diagnosis of the condensate draining state enables not only a many-faceted inspection of the steam trap, but also an indirect detection as to whether or not the sealing performance is satisfactory based on the condensate draining state. This brings about an advantage that the precise inspection of the steam traps can be rationally performed. Therefore, it is desirable to perform the diagnosis of the condensate draining state.

Although the rank of the sealing performance and its numerical deterioration level are displayed on the display 47 of the processing unit 4 in the above inspecting system, the obtained sealing performance deterioration value Vc may be directly displayed as a numerical value. However, it is desirable, from a viewpoint of an easy and precise inspection, to enhance the objectivity of the result display by displaying the rank or the like as described above.

Although the inspecting system is comprised of the inspecting apparatus 1 and the host computer 2 and the inspection results are mainly totaled and analyzed in the host computer 2 in the foregoing embodiment, the totaling and analysis of the inspection results may be partially or entirely performed in the inspecting apparatus 1. Alternatively, the inspecting apparatus 1 may only have functions of detecting and storing the vibration and temperature data, and the host computer 2 may have functions of diagnosing the condensate draining state and calculating the sealing performance deterioration value Vc.

In the foregoing embodiment, the vibration voltage detected by the measuring device 3 is converted into a value between 0 and 100 by the A/D converter 24 and the sealing performance deterioration value Vc is calculated by putting the value after the conversion into Equation (1). However, a factor which enables a collective calculation using Ps (reference steam pressure) and P (working steam pressure) may be put into Equation (1) using the detected level value as it is. Instead of Equation (1), an LUT (look-up table) in which the calculation results of Equation (1) are defined may be used. In such a case, the respective values in the table may be determined based on experimental results without using Equation (1).

As described above, the inventive steam trap inspecting method comprises the steps of detecting a vibration level of a steam trap when its valve is closed; converting the detected vibration level into a sealing performance deterioration value representing a deterioration level of a valve sealing performance of the steam trap under a reference steam pressure using a working steam pressure value; and estimating the sealing performance of the steam trap based on the sealing performance deterioration value.

Accordingly, even if a plurality of steam traps having the same construction are used under different steam pressures, the sealing performance of each steam trap can be precisely estimated. By checking the sealing performance in this way, the steam trap leaking the steam can be correctly detected.

In this case, the sealing performance deterioration value is preferably calculated by the equation:

$$Vc = Vi \cdot \eta \cdot \{1 + a(Ps-P)/P\}$$

where

Vc: sealing performance deterioration value
Vi: detected vibration level
a: correction coefficient
Ps: reference steam pressure
P: working steam pressure.

It should be noted that a more accurate sealing performance deterioration value can be obtained by multiplying the right side of the equation by a coefficient η corresponding to the type of the steam trap.

Preferably, the estimation is made by ranking the sealing performance of the steam trap based on the sealing performance deterioration value. By making the estimation in such a way, the sealing performance of the steam trap can be objectively easily judged.

Further preferably, the temperature of the steam trap is detected, and the sealing performance is estimated by calculating the sealing performance deterioration value when the detected temperature is equal to or above a predetermined specific temperature of the steam trap when no condensate resides.

The temperature of the steam trap is lower when the condensate resides than when no condensate resides. This means that the sealing performance of the valve of the steam trap is satisfactory. Thus, if such a temperature is set as a specific temperature and the sealing performance deterioration value is calculated only when the detected temperature is equal to or above the specific temperature, the estimation of the sealing performance can be rationally made. It should be noted that the phrase "when no condensate resides" means a time during which no condensate resides while the steam trap is properly operating.

Also, the inventive steam trap inspecting apparatus comprises a vibration level detector for detecting the vibration level of the steam trap when its valve is closed, a calculator for converting the detected vibration level into a sealing performance deterioration value representing a deterioration level of a valve sealing performance of the steam trap under a reference steam pressure using a working steam pressure value, and a notifying device for notifying at least either one of the calculated sealing performance deterioration value and an estimation of the sealing performance based on the sealing performance deterioration value.

With such a steam trap inspecting apparatus, the sealing performance deterioration value can be automatically calculated based on the detected vibration level and at least either one of the sealing performance deterioration value and the estimation of the sealing performance is notified. The mode of the notification may be an audio sound or a display on a CRT, LCD or the like. Thus, the inspection of the steam trap can be efficiently performed.

Preferably in the above apparatus, the calculator is adapted to rank the sealing performance of the steam trap based on the sealing performance deterioration value and the notifying device is adapted to notify this rank. Then, the inspection of the steam trap can be efficiently performed.

Preferably, the steam trap inspecting apparatus further comprises a temperature detector for detecting the temperature of the steam trap, and a draining state diagnosing device for checking a condensate draining state of the steam trap based on the detected temperature when the detected temperature is below a predetermined specified temperature when no condensate resides in the steam trap, wherein the notifying device notifies the diagnosis result of the condensate draining state. With this construction, the abnormality of the steam trap due to a defective condensate draining state can also be automatically detected.

Further preferably, the calculator calculates the sealing performance deterioration value when the temperature detected by the temperature detector is equal to or above the specific temperature. With this construction, the inspection of the steam trap can be efficiently performed.

Further, the inventive steam trap management system comprises the above-mentioned steam trap inspecting apparatus which is portable and can obtain inspection results including sealing performance deterioration values of a specified number of steam traps, a management unit for totaling and analyzing a variety of pieces of information of the steam traps including the sealing performance deterioration values, and a transfer unit for transferring the inspection results of the inspecting apparatus to the management unit.

With the management system thus constructed, a time required for totaling and analyzing the inspection results can be remarkably reduced. In this case, it is desirable to construct the management unit to calculate a steam leakage amount using the sealing performance deterioration value of each steam trap and calculate an mount of a loss caused by this steam leakage. With such a management unit, operations including the management and preparation of materials necessary for the maintenance and inspection of the steam traps can be very efficiently performed.

As this invention may be embodied in several forms without departing from the spirit of essential characteristics thereof, the foregoing embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A steam trap inspecting method, comprising the steps of:
    detecting a vibration level of a steam trap when its valve is closed;
    converting the detected vibration level into a sealing performance deterioration value representing a deterioration level of a valve sealing performance of the steam trap under a reference steam pressure using a working steam pressure value; and
    estimating the sealing performance of the steam trap based on the sealing performance deterioration value.

2. A steam trap inspecting method according to claim 1, wherein the sealing performance deterioration value is calculated by the following equation:

$$Vc=Vi \cdot \{1+a \cdot (Ps-p)/p\}$$

where
    Vc: sealing performance deterioration value
    Vi: detected vibration level
    a: correction coefficient
    Ps: reference steam pressure
    P: working steam pressure.

3. A steam trap inspecting method according to claim 2, wherein the estimation is made by ranking the sealing performance of the steam trap based on the sealing performance deterioration value.

4. A steam trap inspecting method according to claim 3, wherein the temperature of the steam trap is detected, and the sealing performance is estimated by calculating the sealing performance deterioration value when the detected temperature is equal to or above a predetermined specific temperature of the steam trap when no condensate resides.

5. A steam trap inspecting method according to claim 1, wherein the estimation is made by ranking the sealing performance of the steam trap based on the sealing performance deterioration value.

6. A steam trap inspecting method according to claim 5, wherein the temperature of the steam trap is detected, and the sealing performance is estimated by calculating the sealing performance deterioration value when the detected temperature is equal to or above a predetermined specific temperature of the steam trap when no condensate resides.

7. A steam trap inspecting method according to claim 1, wherein the temperature of the steam trap is detected, and the sealing performance is estimated by calculating the sealing performance deterioration value when the detected temperature is equal to or above a predetermined specific temperature of the steam trap when no condensate resides.

8. A steam trap inspecting apparatus, comprising:
    a vibration level detector which detects the vibration level of the steam trap when its valve is closed;
    a calculator which converts the detected vibration level into a sealing performance deterioration value representing a deterioration level of a valve sealing performance of the steam trap under a reference steam pressure using a working steam pressure value; and
    a notifying device which notifies at least either one of the calculated sealing performance deterioration value and an estimation of the sealing performance based on the sealing performance deterioration value.

9. A steam trap inspecting apparatus according to claim 8, wherein the calculator is adapted to rank the sealing performance of the steam trap based on the sealing performance deterioration value and the notifying device is adapted to notify this rank.

10. A steam trap inspecting apparatus according to claim 9, further comprising:
    a temperature detector which detects the temperature of the steam trap; and
    a draining state diagnosing device which checks a condensate draining state of the steam trap based on the detected temperature when the detected temperature is below a predetermined specified temperature when no condensate resides in the steam trap;
    wherein the notifying device notifies the diagnosis result of the condensate draining state.

11. A steam trap inspecting apparatus according to claim 10, wherein the calculator calculates the sealing performance deterioration value when the temperature detected by the temperature detector is equal to or above the specific temperature.

12. A steam trap inspecting apparatus according to claim 8, further comprising:
    a temperature detector which detects the temperature of the steam trap; and
    a draining state diagnosing device which checks a condensate draining state of the steam trap based on the detected temperature when the detected temperature is below a predetermined specified temperature when no condensate resides in the steam trap;
    wherein the notifying device notifies the diagnosis result of the condensate draining state.

13. A steam trap inspecting apparatus according to claim 12, wherein the calculator calculates the sealing performance deterioration value when the temperature detected by the temperature detector is equal to or above the specific temperature.

14. A steam trap management system, comprising:
    a portable steam trap inspecting apparatus including:
        a vibration level detector which detects the vibration level of the steam trap when its valve is closed;
        a calculator which converts the detected vibration level into a sealing performance deterioration value representing a deterioration level of a valve sealing performance of the steam trap under a reference steam pressure using a working steam pressure value; and
        a notifying device which notifies at least either one of the calculated sealing performance deterioration value and an estimation of the sealing performance based on the sealing performance deterioration value,
        whereby obtaining inspection results including sealing performance deterioration values of a specified number of steam traps;
    a management unit for totaling and analyzing a variety of pieces of information of the steam traps including the sealing performance deterioration values; and
    a transfer unit for transferring the inspection results of the inspecting apparatus to the management unit.

15. A steam trap management system according to claim 14, wherein the management unit has a function of calculating a steam leakage amount using the sealing performance deterioration value of each steam trap and calculating an mount of a loss caused by this steam leakage.

* * * * *